United States Patent Office 2,711,384
Patented June 21, 1955

2,711,384

METHOD OF KILLING DDT RESISTANT FLIES WITH DDT AND DI(4-CHLOROPHENYL)-ETHINYL CARBINOL

Merrill M. Darley, Little Neck, N. Y., assignor to Allied Chemical & Dye Corporation, New York, N. Y., a corporation of New York No Drawing. Application June 7, 1952,
Serial No. 292,380

3 Claims. (Cl. 167—30)

The present invention relates to insecticides and is particularly concerned with novel insecticidal compositions comprising DDT and dichlorodiphenyl ethinyl carbinols.

DDT is the abbreviation generally employed for designating the compound 2,2-bis(p-chlorophenyl) 1,1,1-trichloroethane. The preparation of this compound is well known and is disclosed many places in the literature. The dichlorodiphenyl ethinyl carbinols may be prepared in known manner by the reaction of sodium acetylide with the corresponding ketone. Thus, for example, the di(4-chlorophenyl) derivative is prepared in known manner by reaction of sodium acetylide and 4,4'-dichlorobenzophenone to form the sodium alcoholate of di(4-chlorophenyl) ethinyl carbinol, which is then hydrolysed to produce di(4-chlorophenyl) ethinyl carbinol.

DDT has been used extensively as the active ingredient in numerous insecticidal compositions. After being initially extremely effective, it has been found that use of DDT has resulted in the development of strains of insects so highly resistant that they can no longer be controlled satisfactorily with DDT alone.

This invention has as an object the provision of insecticidal compositions of enhanced killing power. Another object of the present invention is to provide insecticidal compositions comprising DDT and a dichlorodiphenyl ethinyl carbinol, which compositions display a synergistic action as regards effectiveness with respect to strains of insects, particularly houseflies, which have been found to exhibit resistance to DDT alone.

In accordance with the present invention it has been found that when a dichlorodiphenyl ethinyl carbinol is combined with DDT, the resulting composition exerts a toxicity against insects which is greater than additive with respect to the toxicity exhibited by the constituent parts of the composition.

The preferred dichlorodiphenyl ethinyl carbinol of the invention is di(4-chlorophenyl) ethinyl carbinol which has the structural formula

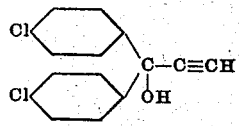

Isomers of di(4-chlorophenyl) ethinyl carbinol such as 2,4'-dichlorodiphenyl ethinyl carbinol may also be effectively employed.

DDT and the dichlorodiphenyl ethinyl carbinol may be mixed together in any suitable manner to form a concentrate which may be subsequently diluted and employed as either a spray or dust. The exact proportions of the toxicant constituents employed vary with the insect to be controlled, the form in which the composition is to be applied and the conditions of application. While the two constituents may be employed in any proportion as to exhibit a synergistic effect, it is preferred to use from about 1/10 to 1 part by weight of the dichlorodiphenyl ethinyl carbinol for each part by weight of DDT.

Liquid sprays may be prepared from finely powdered compositions of the invention by dispersing the composition in water, along with a suitable wetting and dispersing agent and a finely divided solid carrier, if desired. Among suitable wetting and dispersing agents are sulfonated alcohols, soaps, polyglycol derivatives, etc. Among suitable solid carriers are known grades of prepared insecticide carrier clays, pyrophyllite, fuller's earth, etc. Liquid sprays of the compositions of the invention may also be prepared by forming a solution of the composition in a suitable organic solvent, for example, Ultrasene (an odorless kerosene), xylene or other high aromatic petroleum type insecticide oil. The liquid sprays of the invention preferably should contain the toxicant in amount not less than 5 lbs. per 100 gallons, the more usual concentrations being in the range of 10 to 20 lbs. per 100 gallons of spray.

When used in the form of a dust, the compositions of the invention may be mixed with a substantial portion of any suitable finely divided solid carrier. Suitable dusts of this type may consist, for example, of from 1 to 20% of toxicant and from about 80 to 99% of carrier. Satisfactory dusting compositions should contain not less than 1% and preferably not less than 5% by weight of the toxicant.

The insecticidal compositions of the invention may also be applied as aerosol sprays. In accordance with this method the composition is dissolved in a suitable liquefied gas dispersant, e. g. a fluorinated hydrocarbon such as dichlorofluoromethane, and the resulting liquid allowed to escape into the atmosphere through a suitable orifice to form a finely divided suspension of the composition.

One of the most important uses of DDT insecticides is in the control of houseflies. However, it has been established that DDT-resistant houseflies evolve from repetitive applications of DDT.

The following examples show the synergistic effect of mixtures of di(4-chlorophenyl) ethinyl carbinol and DDT when used to control DDT-resistant houseflies (*Musca domestica*).

*Example 1.*—The effectiveness of DDT alone, di(4-chlorophenyl) ethinyl carbinol alone, and a mixture of DDT and di(4-chlorophenyl) ethinyl carbinol was tested against a strain of flies designated as "Wilton," and which had been previously tested and found to exhibit a marked resistance to DDT. Glass plates were sprayed with solutions of the above toxicants and allowed to dry. The DDT-resistant houseflies were then confined over the deposits for various lengths of time, and percent kill was recorded from 20 to 25 hours after initial confinement of the flies. The following results were obtained:

| Toxicant | Concentration (Amt. Toxicant per 100 gal. of water) | Percent Kill (Flies Exposed to Deposit for 30 minutes) | Percent Kill (Flies Exposed to Deposit for 2 hours) |
|---|---|---|---|
| DDT | 20 lbs. of 50% DDT spray powder. | 1.6 | 34.8 |
| Di(4-chlorophenyl) ethinyl carbinol. | 4 lbs. of 50% di-(4-chlorophenyl) ethinyl carbinol spray powder. | 1.5 | 3.6 |
| DDT+di(4-chlorophenyl) ethinyl carbinol. | 20 lbs. of 50% DDT spray powder+4 lbs. of 50% di(4-chlorophenyl) ethinyl carbinol spray powder. | 22.4 | 89.7 |

The above results show that the total effect of the mixture was far greater than the sum of the two effects taken independently, and thus clearly demonstrate that the mixture exerts a pronounced synergistic effect.

*Example 2.*—In a large scale experiment against DDT-resistant flies, three connecting dairy barns were sprayed with a composition of 20 pounds of 50% DDT spray powder and 4 lbs. of 50% di(4-chlorophenyl) ethinyl carbinol spray powder in 100 gallons of water. A fourth connecting barn was sprayed with a mixture containing 20 pounds of 50% DDT spray powder to 100 gallons of water. Good knockdown of flies was obtained with the DDT-di(4-chlorophenyl) ethinyl carbinol composition while DDT alone gave poor knockdown. Inspection of the barns three days following treatment showed that the DDT-di(4-chlorophenyl) ethinyl carbinol composition was still giving good control. On the other hand, flies appeared to be nearly as plentiful as before spraying in the barn treated with DDT alone.

The embodiment set forth in the above examples should be interpreted as illustrative and not in a limiting sense, it being understood that those skilled in the art will be able to formulate other compositions making use of the synergistic DDT-dichlorodiphenyl ethinyl carbinol combination of the present invention without departing therefrom.

I claim:

1. A method which comprises applying to 2,2-bis(p-chlorophenyl) 1,1,1-trichloroethane resistant flies and their habitat a composition comprising as active toxic ingredients 1 part by weight of 2,2-bis(p-chlorophenyl) 1,1,1-trichloroethane and from about $1/10$ to 1 part by weight of di(4-chlorophenyl) ethinyl carbinol, and wherein the mixture of toxicants exerts a synergistic effect.

2. A method which comprises applying to 2,2-bis(p-chlorophenyl) 1,1,1,-trichloroethane-resistant flies and their habitat an aqueous insecticidal spray composition comprising as active toxic ingredients 1 part by weight of 2,2-bis(p-chlorophenyl) 1,1,1-trichloroethane and from about $1/10$ to 1 part by weight of di(4-chlorophenyl)ethinyl carbinol dispersed in water, and wherein the mixture of toxicants exerts a synergistic effect.

3. A method which comprises applying to 2,2-bis(p-chlorophenyl) 1,1,1-trichloroethane-resistant flies and their habitat an insecticidal composition comprising as active toxic ingredients 1 part by weight of 2,2-bis(p-chlorophenyl) 1,1,1-trichloroethane and from $1/10$ to 1 part by weight of di(4-chlorophenyl)ethinyl carbinol and a finely divided insecticidal adjuvant as a carrier for the insecticide, and wherein the mixture of toxicants exerts a synergistic effect.

References Cited in the file of this patent

UNITED STATES PATENTS 2,430,586  Ruthruff et al. _____ Nov. 11, 1947

OTHER REFERENCES

Lauger et al.: Helvetica Chimica Acta, vol. 27, June 15, 1944, pp. 892 to 922 (pp. 892, 909 to 920 relied upon).

Science, vol. 114, July 6, 1951, pp. 6 and 7.

Pest Control, April 1952, pp. 12, 14, 16 and 18.